United States Patent [19]

Suzuki

[11] Patent Number: 5,617,730
[45] Date of Patent: Apr. 8, 1997

[54] COMPRESSOR CONTROL DEVICE FOR CAR AIR CONDITIONER

[75] Inventor: Hideki Suzuki, Chita-gun, Japan

[73] Assignee: Nippondenso Co., Ltd., Kariya, Japan

[21] Appl. No.: 593,721

[22] Filed: Jan. 29, 1996

[30] Foreign Application Priority Data

Jan. 30, 1995 [JP] Japan .................... 7-012622

[51] Int. Cl.⁶ ........................................ B60H 1/32
[52] U.S. Cl. ...................... 62/133; 62/83; 62/323.4
[58] Field of Search ................. 62/133, 83, 243, 62/244, 323.1, 323.4, 158, 157, 231

[56] References Cited

U.S. PATENT DOCUMENTS 4,480,443  11/1984  Nishi et al. .................. 62/323.4 X
4,939,909  7/1990  Tsuchiyama et al. ............ 62/158
5,056,326  10/1991  Ohkumo et al. ................ 62/133
5,347,824  9/1994  Kato et al. .

FOREIGN PATENT DOCUMENTS 58-191426  11/1983  Japan .
60-146924  8/1985  Japan .

Primary Examiner—Harry B. Tanner
Attorney, Agent, or Firm—Cushman, Darby & Cushman IP Gorup of Pillsbury Madison & Sutro LLP

[57] ABSTRACT

If an engine is stopped with a switch of an air-conditioner being on, such state is memorized. When the engine is started after dead soak, a compressor is driven automatically until a crank shaft has driven several revolutions to discharge liquid refrigerant from the compressor without liquid-compressing noise. When the engine starts, the compressor is deactivated until the air-conditioner switch is turned on by a driver.

11 Claims, 4 Drawing Sheets

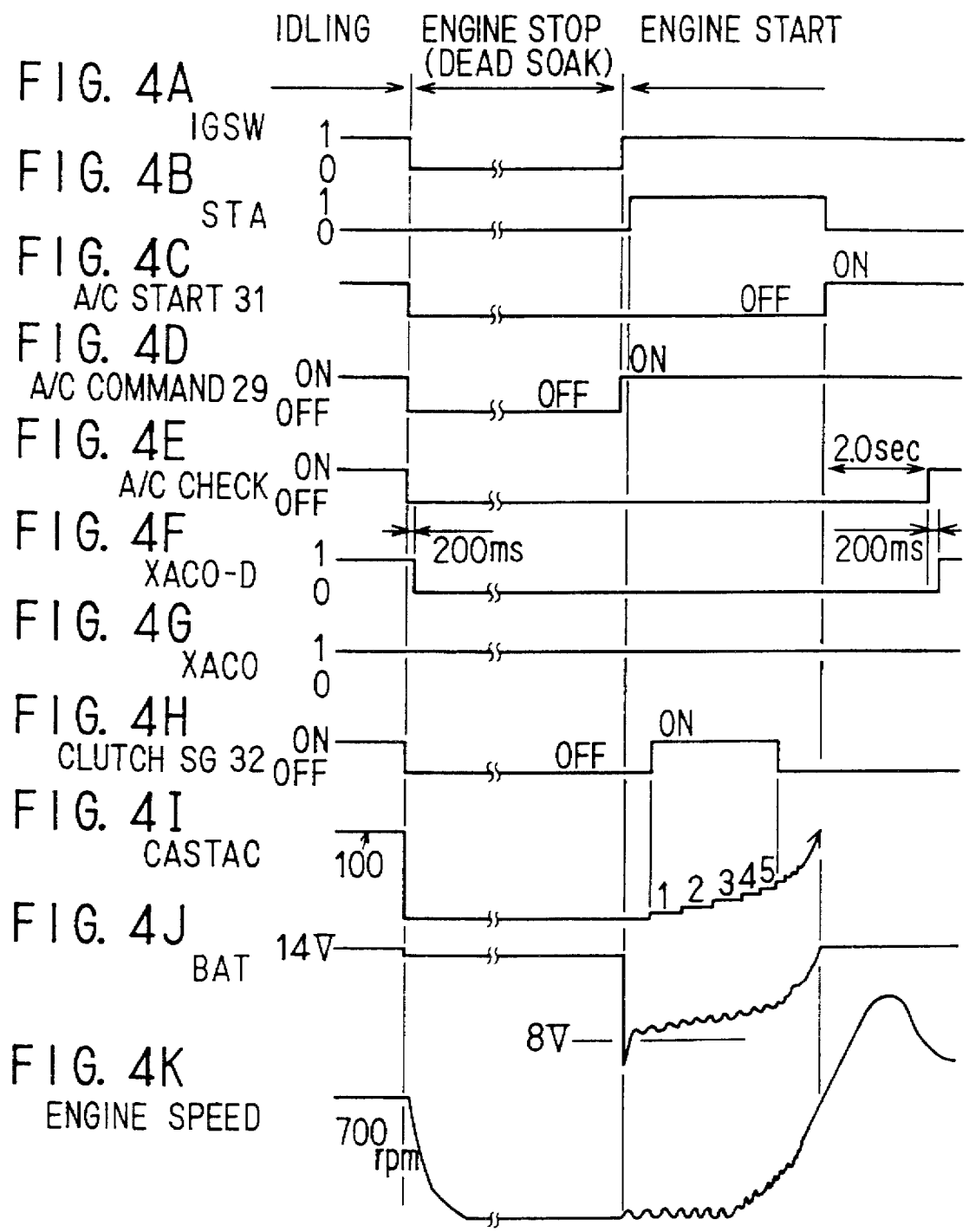

COMPRESSOR CONTROL DEVICE FOR CAR AIR CONDITIONER

CROSS REFERENCE TO RELATED APPLICATION

The present application is based on and claims priority from Japanese Patent Application Hei 7-12622, filed on Jan. 30, 1995, the contents of which are incorporated herein by reference.

BACKGROUND OF THE INVENTION

1. Field of the Invention

The present invention relates to a compressor control device for a car air conditioner in order to discharge liquid refrigerant from the compressor.

2. Description of Related Art

When a vehicle is parked outdoors in the daytime, temperature in the passenger compartment is heated by the sun shine and becomes higher than temperature in the engine room in the day time. If a vehicle is parked for long time, more than 2 days for instance, without using a car air conditioner, the above-mentioned temperature difference occurs repeatedly, resulting in that the refrigerant in an evaporator which is disposed adjacent to the passenger compartment moves to a compressor which is disposed in the engine compartment at a portion lower than the evaporator and a condenser of the air conditioner system and become liquid when temperature falls. When the compressor is operated in this state, the liquid compressed to generate noise and to cause damage to the compressor.

In order to solve the above problem, a compressor control device is proposed in U.S. Pat. No. 5,347,824, which corresponds to Japanese Patent Laid Open Hei 345513. When the air conditioner is started, the device drives the compressor intermittently so that the liquid refrigerant may be discharged from the compressor gradually, thereby to reduce noise caused by compression of the liquid refrigerant.

However, since the above device drives the compressor with the liquid refrigerant therein intermittently, the noise cannot be reduced sufficiently.

SUMMARY OF THE INVENTION

In view of the above described circumstances, it is a primary object of the present invention to provide a compressor control device which discharges the liquid refrigerant from the compressor without significant compression-noise.

Another object of the present invention is to provide a compressor control device for a car-air-conditioner which includes means for driving the compressor at a limited speed or within a limited number of revolutions of the engine to discharge liquid refrigerant from said compressor without liquid-compression-noise when said engine is started.

A further object of the present invention is to provide a compressor control device which deactivates the compressor when the last operation of the air-conditioner is not memorized by memorizing means.

A still further object of the present invention is to provide a compressor control device which deactivates the compressor when the number of revolutions of the engine becomes a predetermined number.

A still further object of the present invention is to provide a compressor control device which deactivates the compressor when the battery voltage is lower than a predetermined value.

A further object of the present invention is to provide a compressor control device which reduces capacity of the compressor when the compressor is driven by the driving means.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 4A, 4B, 4C, 4D, 4E, 4F, 4G, 4H, 4I, 4J and 4K are time charts showing respectively operation of various portions of the device according to the embodiment.

DETAILED DESCRIPTION OF THE PREFERRED EMBODIMENT (First Embodiment)

Preferred embodiments will be described with reference to appended drawings hereafter.

Figure 1:
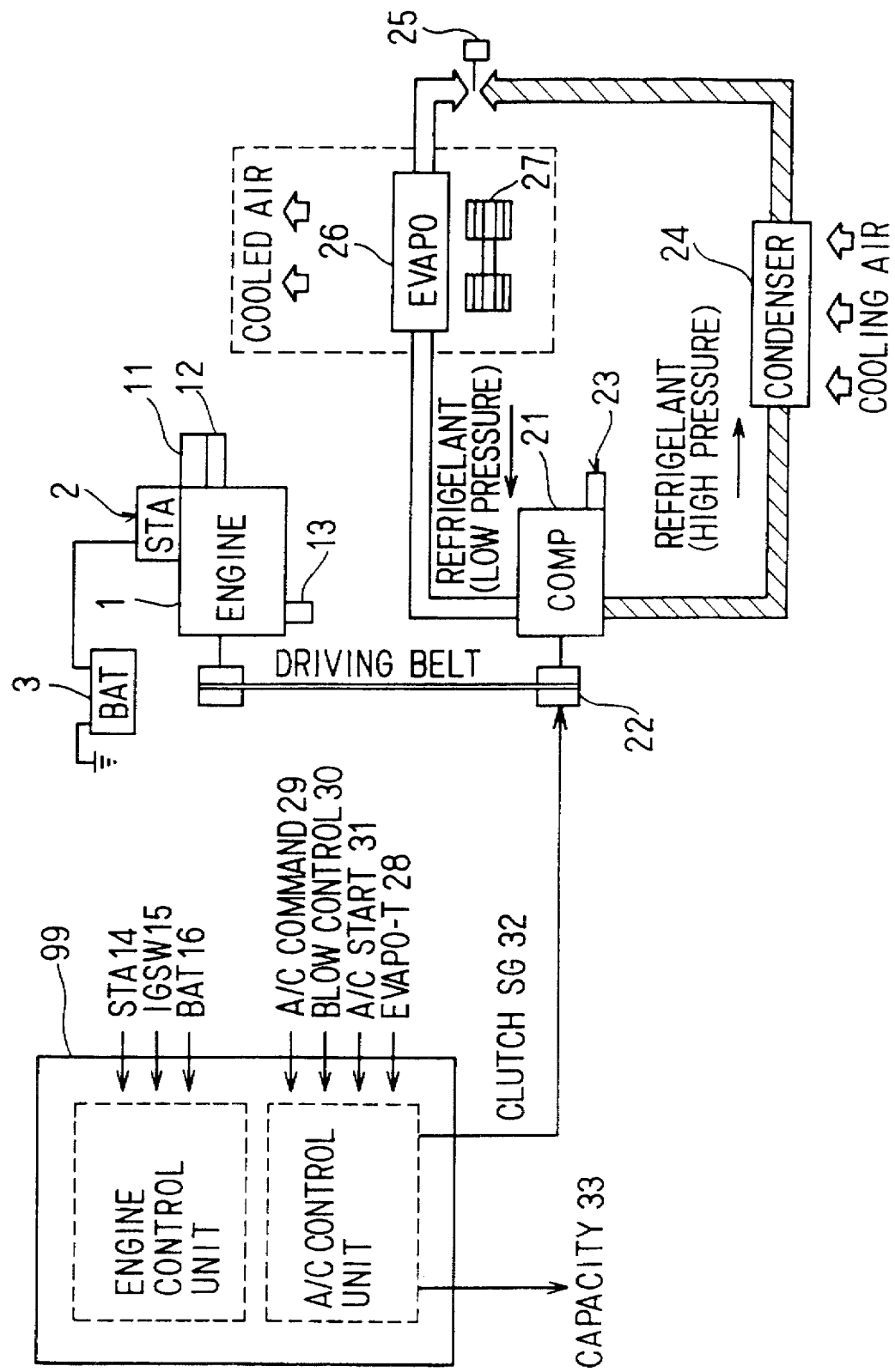
FIG. 1 is a block diagram of a compressor control device according to a first embodiment of the present invention.
Figure 2:
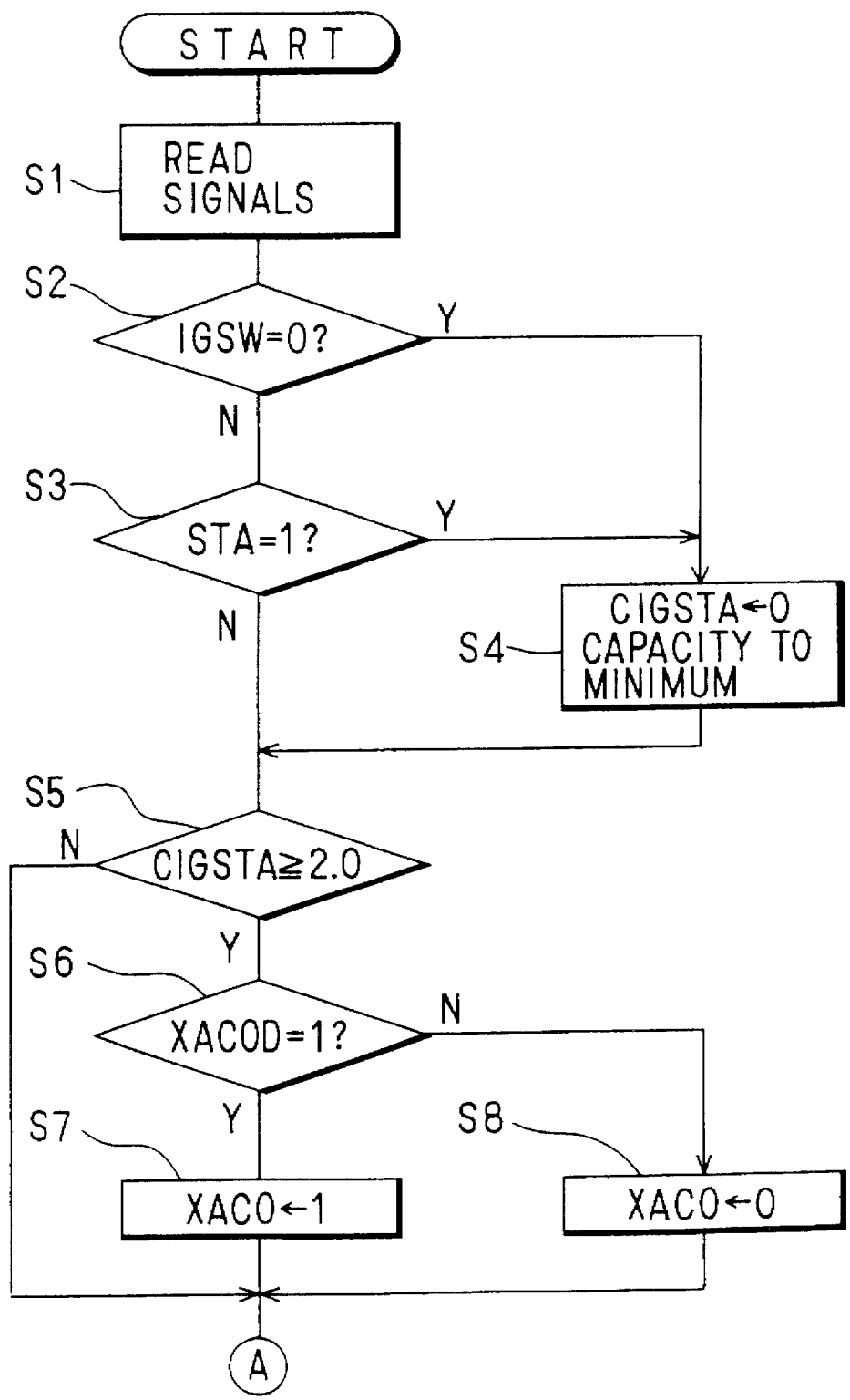
FIG. 2 is a flow chart showing a part of process executed by an ECU according to the first embodiment.

An engine-driven compressor control device according to a first embodiment of the present invention is described with reference to FIG. 1.

When a key switch is operated by a driver, a starter signal 14 is generated to turn on a magnet switch (not shown), through which driving current is supplied from a battery 3 to drive a starter motor 2, and an ignition signal 15 is generated to ignite fuel supplied by a fuel supplying system (not shown) of an engine 1, thereby starting the engine 1.

Engine operation is detected by a rotation angle sensor 11, a cylinder identification sensor 12 and a cooling water temperature sensor 13, which are disposed around the engine 1 and connected to an engine control unit (hereinafter referred to as ECU) 99. A battery voltage sensor (not shown) is also connected to the battery 3 to send a battery voltage signal 16 to the ECU 99.

A refrigerant circulating system of an air conditioner is composed of a variable capacity compressor 21, a condenser 24 for cooling and condensing the high temperature refrigerant sent from the compressor 21, an expansion valve 25 for decompressing the refrigerant, an evaporator 26 for evaporating the refrigerant and a blower motor 27 for sending air blow into the passenger compartment through the evaporator 26. The compressor 21 is driven by the engine through a belt and a magnet clutch 22 and changes volume of the compressor chamber from 100% capacity to 5% capacity (minimum) by a capacity switching valve 23. The air flow of the blower motor is controlled according to a blower control signal 30.

Air-conditioner-operation is detected by an evaporator temperature sensor 28 disposed at a downstream portion of the evaporator 26, a switch (not shown) for the air-conditioner generating an air-conditioner-command signal 29, a switch (not shown) for the blower motor generating a blower-motor-control signal 30, a contact (not shown) disposed inside the ignition switch for generating an air-conditioner-starting signal 31 to start the air-conditioner, which are transmitted to the ECU 99.

An air-conditioner control unit is included in the ECU 99 together with an engine control unit. However it can be separated from the ECU 99.

Operation of the air conditioner is described with reference to a flow chart shown in FIG. 2 and FIGS. 4A through 4K.

Signals from the rotation angle sensor 11, the cooling water temperature sensor 13, the starter signal 14, the ignition signal 15, the battery voltage signal 16 and the air-conditioner-command signal 29 are respectively read out to calculate an engine rotational speed N, an engine temperature THW and battery voltage BAT in a step S1. Then, whether the ignition switch (IGSW) is turned on (binary number 1, hereinafter referred to as 1) or not (binary number 0, hereinafter referred to as 0) is detected in a step S2. If IGSW is not 0 but 1, the process goes to a step S3, where whether or not the starter motor 2 (STA) is 1 or 0 is checked. If IGSW is 0, or STA is 1, the process goes to a step S4, where a counter CIGSTA is set to 0 as shown in FIGS. 4A, 4B and 4E in order to prohibit changing of a flag XACO in the following steps S7 and S8, and a driving signal for the capacity switching valve 23 is set to OFF in order to set the capacity of the compressor 21 to a minimum capacity (5%, for example). That is, when the ignition switch is turned off to stop the engine or when the starter switch is turned on to start the engine, the capacity of the compressor is reduced to the minimum capacity.

When the capacity of the compressor is set to the minimum capacity, the liquid refrigerant is reduced, and the liquid compressing noise is reduced.

When the starter motor is stopped or not in operation (STA=0), the process goes to a step S5, where whether a counter CIGSTA has counted 2.0 seconds or not is checked (FIGS. 4B and 4E). This step is necessary because it takes about 2 seconds for the air-conditioner control unit in the ECU 99 to determine that the air-conditioner signal is ON. This time period changes with the type and process of the control unit. If the counter CIGSTA has counted time 2.0 seconds, the process goes to a step S6, where the flag XACO-D representing ON/OFF state of the air conditioner is permitted to be changed. The counter CIGSTA increments automatically every 32 milli-seconds. When the air conditioner is turned on and the flag XACO-D is set to 1, the process goes to a step S7 to set the flag XACO to have 1.

The flag XACO-D is a ON/OFF flag of the air conditioner generated 200 milli-seconds behind the air-conditioner-command signal 29, as shown in FIG. 4F, in order to prevent trouble caused by chattering noise included in the signal 29 which is generated by ON/OFF operation of an A/C switch. The delay time also prevents the air-conditioner control unit from generating an erroneous signal (OFF signal) if the air-conditioner-starting signal 31 changes before the ignition signal 15 changes due to variation of the key switch when the engine is stopped.

On the other hand, when the air conditioner is not turned on or XACO-D is 0, the process goes to a step S8 to rewrite the flag XACO to have 0. The state of the flag XACO remains after the engine is stopped because the flag is formed in a non-volatile RAM. If the air-conditioner has been used before the engine is stopped with the switch remaining on (the air-conditioner-command signal 29 is ON), the flag XACO becomes 1 and maintains this state until it is rewritten at some future time as shown in FIG. 4C and FIG. 4G.

When the starter motor 2 is energized, the air-conditioner-starting signal 31 becomes OFF and operation of the air-conditioner control unit is stopped forcibly in order to prevent unstable operation due to low battery voltage which is caused by the starter operation. When the starter is deenergized thereafter, the battery voltage returns to a normal voltage and the air-conditioner-starting signal 31 becomes ON to operate the air-conditioner control unit as shown in FIGS. 4B and 4C.

Figure 3:
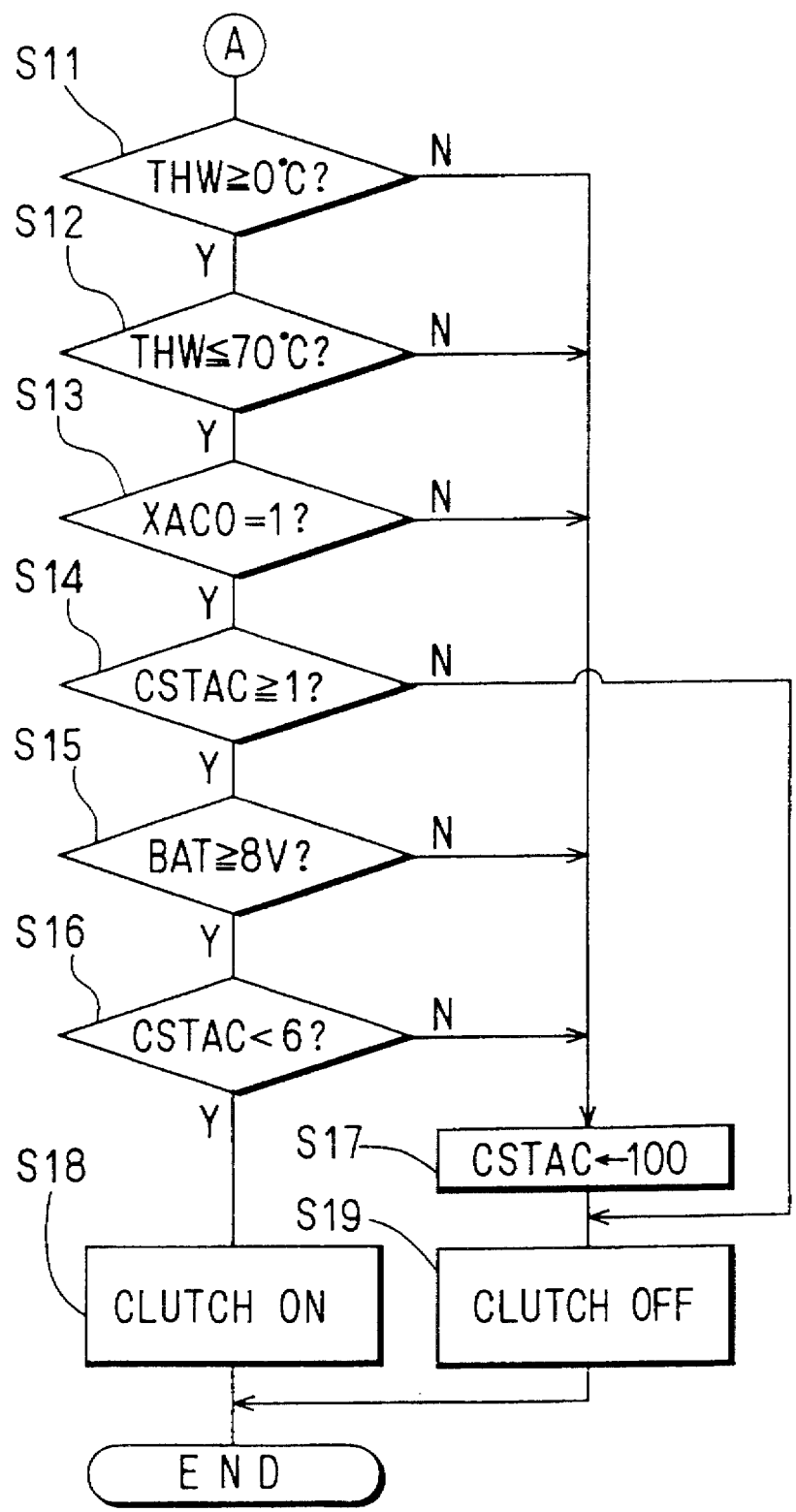
FIG. 3 is a flow chart showing a part of the process executed by an ECU according to the first embodiment.

Whether to drive the compressor or not is determined in steps S11 through S17 shown in FIG. 3.

Engine temperature is checked in steps S11 and S12 to drive the compressor in a fixed temperature range.

When the engine temperature is 0° C. or below 0° C. the compressor is not driven in order to prevent the evaporator from frosting. When the engine is already warmed up, for example, to 70° C. the amount of the liquid refrigerant remaining in the compressor is generally small and the compressor control is not necessary. Then, whether the flag XACO is 1 or not is checked in a step S13, that is, whether the A/C switch of the air conditioner was left on or not when the engine is stopped last time is checked. If YES, the process goes to a step S14.

The step S13 is to determine whether the compressor will be driven or not.

Incidentally, if the compressor is driven frequently but in short time regardless of driver's intention, lubricating oil may be discharged as the liquid refrigerant is discharged from the compressor. Accordingly, it is preferable to drive the compressor only when a driver needs the air-conditioning. The step 13 determines that possibility of using the air-conditioner is high if the air-conditioner switch was turned on the last time.

In the step S14, whether a crank shaft of the engine 1 has made one revolution or not after engine has started by a counter CSTAC. If YES, the process goes to a step S15. If NO, the process is terminated in order to prevent the magnet clutch 22 from being energized.

In the step 15, whether voltage BAT of the battery 3 is no less than 8 volt or not is checked (FIG. 4J).

If the clutch operates when the battery voltage is lower than 8 volt, the clutch may slip and cause abnormal wear of the clutch and screeching. In addition, the starter motor 2 runs at a low speed and the cranking speed becomes low with the result of failure in starting the engine. The step S15 is provided to prevent the above problems.

Then whether a counted number of the counter CSTAC is less than 6 or not is checked in a step S16 (FIG. 4I). If YES, the step goes to a step 18, where the magnet-clutch-driving signal 32 is applied to the magnet clutch 22 to drive the compressor 21 at the same time as the engine is started as shown in FIGS. 4H and 4K. That is, when the number of the crank revolutions is less than 6 at a low starting speed, the compressor is driven to discharge the liquid refrigerant without the liquid-compressing noise.

When the number of revolution increases to, for example, more than 5, engine runs by itself and running speed increases. If the compressor with a small amount of liquid-refrigerant remaining therein is connected to the engine crank shaft at this time, the liquid-compressing noise may be generated, and the engine may not start fully because the compressor has to compress the liquid refrigerant.

The set number of revolutions of the crank shaft may change with the type of engine and sense or feeling of the designer. For example, the compressor may be disconnected when the engine rotational speed becomes higher than 300 RPM.

If NO is determined in the steps S11, S12, S13, S15 and S16, the next step is S17, where the counter CSTAC=100 is processed to deenergize the magnet clutch 22. The process timing of the above base program is about 4 milli-seconds.

The compressor control is summarized with reference to time charts shown in FIGS. 4A through 4K.

When the engine is stopped with the air-conditioner-command signal 29 being ON, this information is memorized by the flag XACO (FIG. 4G). When the engine is started by the starter motor 2 (FIGS. 4B and 4K) after dead soak (time period of the engine at a standstill after the engine runs at an idling speed) and the air-conditioner command signal 29 becomes ON (FIG. 4D) and the flag XACO maintains 1 (FIG. 4G), the magnet clutch 22 is energized to drive the compressor 23 when a first revolution of the crank shaft is counted until five revolutions are counted (FIGS. 4H and 4I). When the number of the crank-shaft-revolutions becomes more than 5, the compressor is deenergized (FIGS. 4H and 4I). The air-conditioner-starting signal 31 is detected by the ECU 99 2.0 seconds after the starter motor 2 stops and the air-conditioner-starting signal 31 becomes ON (FIGS. 4B, 4C and 4E).

(Second Embodiment)

The compressor drive at a low speed of the engine as described above can be repeated as in the method disclosed in U.S. Pat. No. 5,347,824. As a result, the liquid refrigerant can be fully discharged without significant liquid-compressing noise even if much more liquid refrigerant collects in the compressor.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A compressor control device for a car-air-conditioner having a compressor driven by an engine having a starter comprising:

means for detecting start of an engine by said starter; and means for discharging liquid refrigerant from said compressor when said engine start detecting means detects start of said engine.

2. A compressor control device as claimed in claim 1 further comprising means for memorizing operation of said car-air-conditioner before said engine is stopped, wherein said discharging means comprises means for deactivating said compressor if said last operation is not memorized by said memorizing means when said engine is started.

3. A compressor control device as claimed in claim 1 further comprising means for detecting number of revolutions of said engine, wherein said discharging means comprises means for deactivating said compressor when said number of revolutions becomes a predetermined number.

4. A compressor control device as claimed in claim 1 further comprising a battery voltage sensor, wherein said discharging means comprising means for deactivating said compressor when said battery voltage is lower than a predetermined value.

5. A compressor control device as claimed in claim 1 further comprising:

first control means for changing capacity of said compressor to minimum capacity when said engine is stopped if said last operation of said car-air-conditioner is memorized by said memorizing means; and second control means for changing capacity of said compressor to minimum capacity when said engine is started and said compressor is driven by said driving means.

6. A compressor control device driven by an engine through a magnet clutch for a car-air-conditioner having a switch comprising:

means for detecting number of revolutions of said engine; and means, connected to said revolution detecting means, for controlling said magnet clutch to drive said compressor within a limited number of revolutions to discharge liquid refrigerant from said compressor without liquid-compression-noise when said engine is started.

7. A compressor control device as claimed in claim 6 further comprising means for memorizing last operation of said car-air-conditioner, wherein said magnet clutch control means comprises first means for deactivating said compressor when said last operation is not memorized by said memorizing means until said switch is turned on.

8. A compressor control device as claimed in claim 6 further comprising a battery voltage sensor, wherein said magnet clutch control means comprises a second means for deactivating said compressor when said battery voltage is lower than a predetermined value.

9. A compressor control device as claimed in claim 7 further comprising means for changing capacity of said compressor to minimum capacity when said engine is stopped if said last operation of said car-air-conditioner is memorized by said memorizing means.

10. A compressor control device driven by an engine through a magnet clutch for a car-air-conditioner having a switch comprising:

a control unit;

a starter signal generator connected to said control unit for generating a signal to start said engine;

an ignition signal generator connected to said control unit for generating a signal to ignite fuel of said engine;

a battery voltage sensor connected to said control unit;

means for detecting number of revolutions of said engine;

means, connected to said revolution detecting means, for controlling said magnet clutch to drive said compressor within a limited number of revolutions to discharge liquid refrigerant from said compressor without liquid-compression-noise when said starter signal and said ignition signal are generated; and means for deactivating said compressor when battery voltage is lower than a predetermined value.

11. A compressor control device as claimed in claim 10 further comprising means for memorizing last requirement for operation of said car-air-conditioner, wherein said magnet clutch control means comprises first means for deactivating said compressor when said last requirement is not memorized by said memorizing means until said switch is turned on.

\* \* \* \* \*